United States Patent
Matsuzaki et al.

(10) Patent No.: US 6,478,078 B1
(45) Date of Patent: Nov. 12, 2002

(54) HEAT EXCHANGER FOR COOLING CIRCULATING WATER OF FUEL CELLS & PROCESS FOR PRODUCING SAME

(75) Inventors: Tsutomu Matsuzaki; Yoshihiro Sasaki; Chizuko Yoshida, all of Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/669,689

(22) Filed: Sep. 26, 2000

(30) Foreign Application Priority Data

Sep. 28, 1999 (JP) .......................................... 11-274608
Aug. 7, 2000 (JP) ...................................... 2000-238097

(51) Int. Cl.⁷ ............................................. F28F 19/02
(52) U.S. Cl. ........................ 165/133; 138/145; 427/409; 427/327
(58) Field of Search ........................... 165/133, 134.1, 165/173; 428/650; 138/145; 427/409, 327

(56) References Cited

U.S. PATENT DOCUMENTS

| | | | | | |
|---|---|---|---|---|---|
| 3,650,005 A | * | 3/1972 | Kamiya et al. | ............. | 165/133 |
| 3,951,207 A | * | 4/1976 | Baumann et al. | ........... | 165/133 |
| 4,101,691 A | * | 7/1978 | Borchert | ...................... | 165/133 |
| 4,206,248 A | * | 6/1980 | Schmidlin | .................... | 165/133 |
| 4,231,422 A | * | 11/1980 | Moranne | ..................... | 165/133 |
| 4,368,776 A | * | 1/1983 | Negita et al. | ................ | 165/133 |
| 4,427,034 A | * | 1/1984 | Nagata et al. | .............. | 165/133 |
| 4,611,471 A | * | 9/1986 | Ohashi | ........................ | 165/133 |
| 4,776,384 A | * | 10/1988 | Kawabe et al. | ............. | 165/133 |
| 5,246,065 A | * | 9/1993 | Huff | ............................ | 165/173 |
| 5,720,340 A | * | 2/1998 | Ohara et al. | ................ | 165/133 |
| 6,170,564 B1 | * | 1/2001 | Steele | ......................... | 165/133 |
| 6,251,002 B1 | * | 6/2001 | Close | ......................... | 451/544 |

FOREIGN PATENT DOCUMENTS

JP  53-104460  9/1978

* cited by examiner

*Primary Examiner*—Henry Bennett
*Assistant Examiner*—Terrell McKinnon

(57) ABSTRACT

The invention relates to a heat exchanger for cooling a circulating water of a fuel cell. This heat exchanger includes (1) an aluminum member having an inner surface which defines an inner space in the aluminum member such that the circulating water is allowed to flow through the inner space; and (2) a resin coating layer formed on the inner surface of the aluminum member. It becomes possible to prevent contamination of the circulating water by the provision of the resin coating layer. The heat exchanger can be produced by a first process including (a) providing a core portion having tubes made of aluminum and corrugated fins, which are alternately arranged; (b) assembling the core portion and a tank made of aluminum into an assembly; (c) brazing the assembly by heating into a brazed assembly; and (d) coating the inner surface of the brazed assembly with a resin coating layer.

27 Claims, 6 Drawing Sheets

HEAT EXCHANGER FOR COOLING CIRCULATING WATER OF FUEL CELLS & PROCESS FOR PRODUCING SAME

BACKGROUND OF THE INVENTION

The present invention relates to a heat exchanger for cooling a circulating water of fuel cells and a process for producing the heat exchanger.

A fuel cell system having a high-polymer electrolyte film is known as an automotive fuel cell. In this system, a hydrogen fuel in a stack is turned to proton by the catalytic action of a proton catalyst carried on the high-polymer electrolyte film, and oxygen is supplied to the opposite side of the high-polymer electrolyte film, thereby generating electric potential. It is necessary to cool pure water circulating through the stack by a heat exchanger in order to control the reaction of the fuel cell. This circulating water is brought into a direct contact with the proton catalyst in the system. Thus, it is desired to prevent contamination of the circulating water, for example, caused by ions of metals and the like, in order to protect the proton catalyst. Thus, stainless steel is used for tubes and other parts of the heat exchanger to prevent such contamination.

SUMMARY OF THE INVENTION

The inventors have found that the use of stainless steel makes a heat exchanger heavier in weight due to its relatively high specific gravity and makes it larger in size due to its relatively low thermal conductivity, thereby increasing the production cost.

It is an object of the present invention to provide a heat exchanger for cooling a circulating water of a fuel cell, which can assuredly prevent contamination of the circulating water even if a material other than stainless steel is used for the heat exchanger.

It is another object of the present invention to provide a process for producing such heat exchanger.

According to the present invention, there is provided a heat exchanger for cooling a circulating water of a fuel cell. This heat exchanger comprises (1) an aluminum member having an inner surface which defines an inner space in said aluminum member such that said circulating water is allowed to flow through said inner space; and (2) a resin coating layer formed on said inner surface of said aluminum member such that said resin coating layer is in contact with said circulating water when said circulating water flows through said inner space. The aluminum member may comprise a plurality of tubes and a tank connected to the tubes. In the present application, "aluminum alloys" may be referred to as "aluminum" for simplification. Thus, aluminum alloys are included in the scope of the term "aluminum" in the claims. The heat exchanger may comprise a plurality of corrugated fins. The fins and tubes may be alternately arranged and assembled together into a core portion or laminate portion of the heat exchanger.

According to the present invention, it is possible to make a heat exchanger lighter in weight and smaller in size by the use of the aluminum member, thereby decreasing the production cost, as compared with the case of using stainless steel. Furthermore, according to the present invention, a resin coating layer is formed on the inner surface of the aluminum member. With this, it is possible to assuredly prevent contamination of the circulating water which may be caused by ions of metals (e.g., aluminum and metals of flux) and the like.

According to the present invention, there is provided a first process for producing the heat exchanger. The first process comprises (a) providing a core portion of said heat exchanger, said core portion comprising a plurality of tubes, each being made of aluminum, and a plurality of corrugated fins, said tubes and said fins being alternately arranged and assembled together into said core portion; (b) assembling said core portion and a tank made of aluminum into an assembly; (c) brazing said assembly by heating into a brazed assembly; and (d) coating an inner surface of said brazed assembly with a resin coating layer such that said resin coating layer is in contact with said circulating water when said circulating water flows through an inner space of said brazed assembly, said inner space being defined by said inner surface.

According to the present invention, there is provided a second process for producing the heat exchanger. The second process comprises (a) providing a laminate portion of said heat exchanger, said laminate portion comprising a plurality of tubes, each being made of aluminum, and a plurality of corrugated fins, said tubes and said fins being alternately arranged and assembled together into said laminate portion; (b) assembling said laminate portion and a base portion of a tank into a core portion of said heat exchanger, said base portion being made of aluminum; (c) brazing said core portion by heating into a brazed core portion; (d) coating an inner surface of said brazed core portion with a resin coating layer such that said resin coating layer is in contact with said circulating water when said circulating water flows through an inner space of said brazed core portion, said inner space being defined by said inner surface; and (e) mounting a major portion of said tank on said base portion of said tank, thereby forming said tank. This major portion may be made of a resin.

DESCRIPTION OF THE PREFERRED EMBODIMENTS

The resin coating layer is made preferably of a thermosetting resin. With this, it becomes possible to assuredly form a resin coating layer on the inner surface of the aluminum member.

The resin coating layer has a thickness preferably of 3–20 μm, more preferably of 5–20 μm. With this, it becomes possible to make the resin coating layer uniform in thickness, without having pinholes or other problems in the layer. If it is less than 3 μm, the layer may have the problem of pinholes or the like. If it is greater than 20 μm, the layer may not become uniform in thickness.

Figure 2:
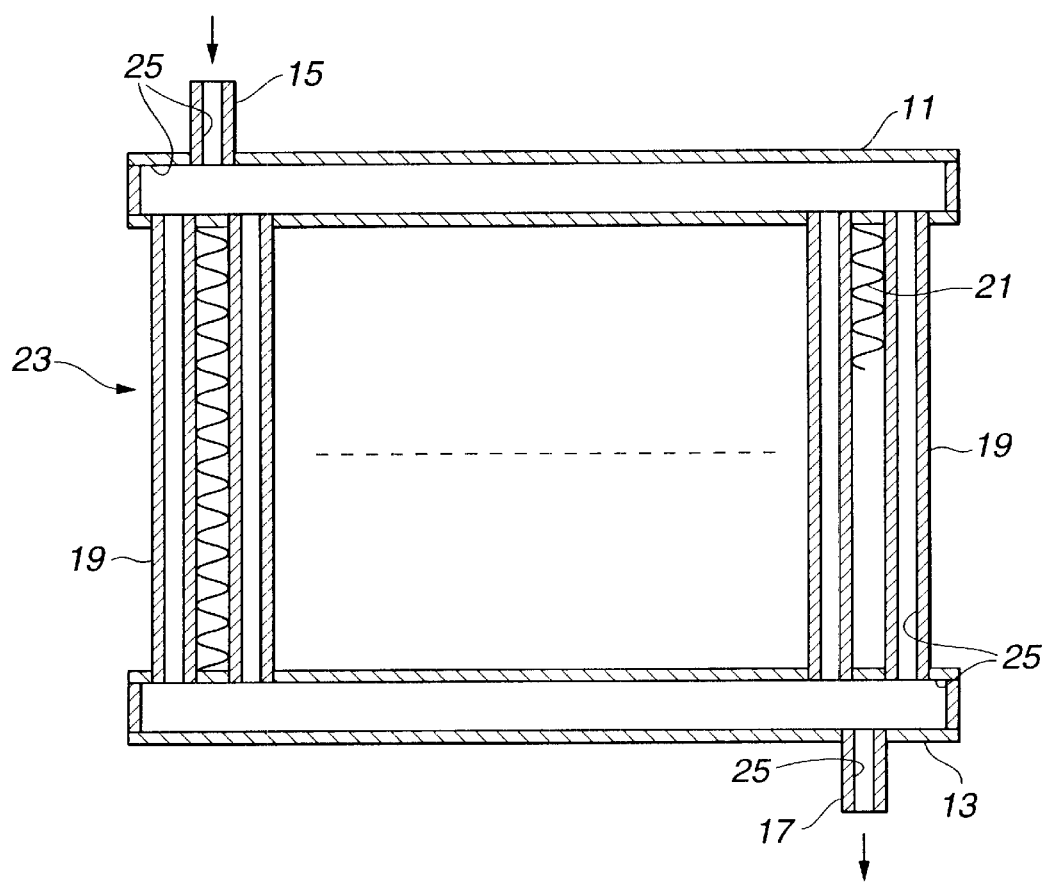
FIG. 2 is a sectional view showing a heat exchanger prepared by the first process.

FIG. 2 shows a heat exchanger prepared by the first process. This heat exchanger can be used for cooling a circulating water of a fuel cell. This circulating water circulates through a fuel cell and may be pure water or a mixture of pure water and antifreezing agent (e.g., ethylene glycol). The heat exchanger comprises an inlet (top) tank 11 and an outlet (bottom) tank 13 which are opposed to each other to have a predetermined distance therebetween. Each of the inlet and outlet tanks 11 and 13 has a rectangular section and can be made of a clad aluminum. This clad aluminum may have an aluminum substrate and a brazing metal layer(s) formed on the aluminum substrate. The aluminum substrate may be made of an aluminum-alloy specified by JIS (Japanese Industrial Standard) 3003, and the brazing metal layer may be made of another aluminum alloy specified by JIS 4343 having a lower melting point than that of the former aluminum alloy. An inlet pipe 15 is connected with the inlet tank 11 in order to introduce a circulating water of a fuel cell into the inlet tank 11. An outlet pipe 17 is connected with the outlet tank 13 in order to discharge a circulating water from the outlet tank 13. Each of the inlet and outlet pipes 15 and 17 may be made of the above clad aluminum and may have a circular section. A plurality of tubes 19 and a plurality of corrugated fins 21 are alternately arranged and assembled together into a core portion or laminate portion 23 of the heat exchanger. This core portion 23 is sandwiched between the inlet and outlet tanks 11 and 13. The tubes 19 may be made of the above clad aluminum. The corrugated fins 21 can also be made of an aluminum alloy specified by JIS 3003. The inner surface of the aluminum member is coated with a resin coating layer 25. In other words, the inner surface of each of the inlet pipe 15, the inlet tank 11, the tubes 19, the outlet tank 13 and the outlet pipe 17 is coated with the resin coating layer 25 in accordance with the first process of the invention.

Figure 1:
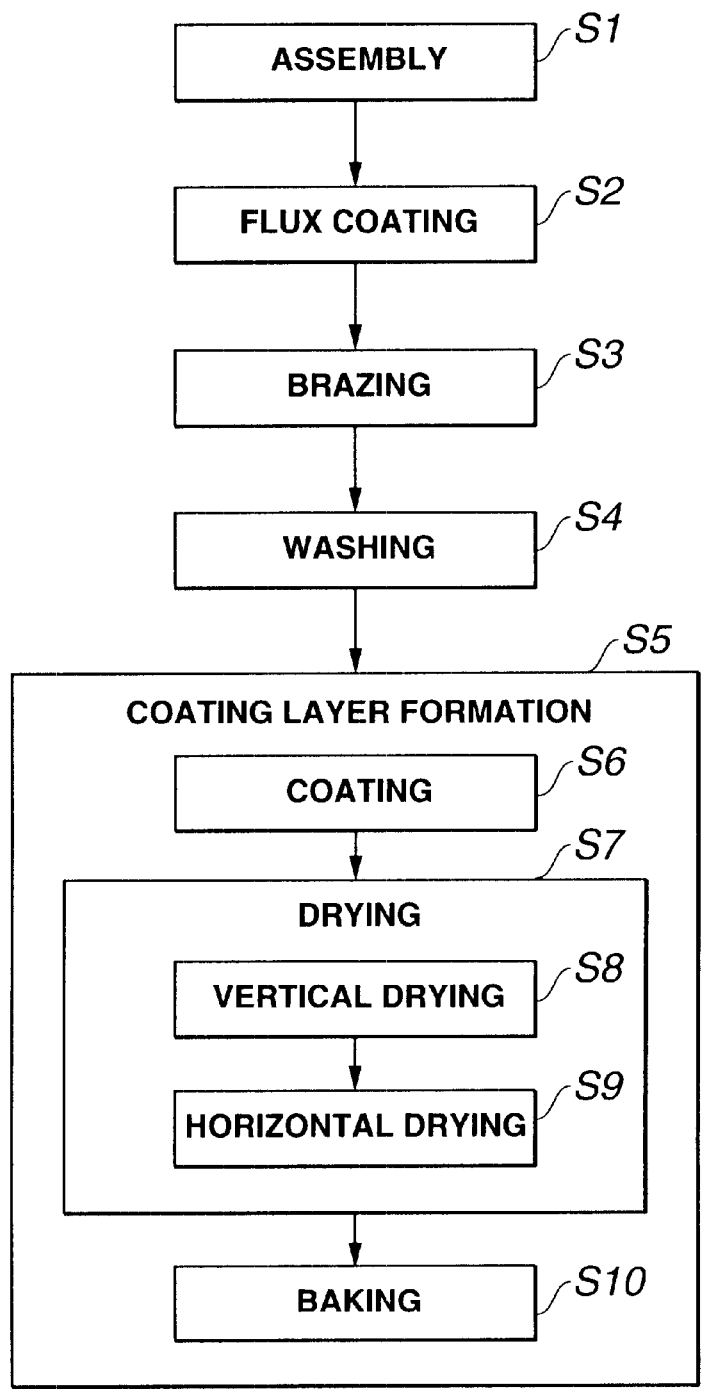
FIG. 1 is a flowchart showing a first process for producing a heat exchanger of the invention.

With reference to FIGS. 1–3 and 4A–4C, a first process according to the invention will be described in detail in the following. At first, the tubes 19 and the corrugated fins 21 are alternately arranged and assembled together into the core portion 23. Then, assembly Si of FIG. 1 is conducted by assembling together the core portion 23, the inlet and outlet tanks 11 and 13 and the inlet and outlet pipes 15 and 17 into an assembly.

Then, flux coating S2 is conducted by applying a flux for brazing to the assembly. This flux may be a noncorrosive flux such as NOCOLOK FLUX (trade name) of ALCAN Corporation. It is preferable to apply the flux only to the outer surface of the assembly, for example, by pouring an aqueous solution of NOCOLOK FLUX onto the outer surface or by applying a shower of this aqueous solution thereto, in a way to minimize the adhesion of this aqueous solution to the inner surface of the assembly. Then, the applied flux is dried by applying hot air to remove water therefrom.

After that, brazing S3 is conducted by brazing the assembly by heating into a brazed assembly. In fact, the constituent parts of the assembly are fixedly secured to each other by the brazing. This brazing may be conducted by heating the assembly at 600° C. for a predetermined time in a brazing furnace having an atmosphere of nitrogen gas.

Then, washing S4 is conducted by removing the flux from the inner surface of the brazed assembly. The flux can be removed by bringing the flux into contact with a hot pure water. For example, the brazed assembly may be immersed in a hot pure water of 100° C. for 24 hr in order to substantially perfectly remove the flux. Besides hot pure water, it is optional to use an alkali degreasing agent for aluminum. In this case, however, it is necessary to conduct a subsequent treatment such as washing with water. Thus, it is preferable to use a hot pure water to remove the flux. Due to the removal of the flux, the resin coating layer can fixedly be attached to the inner surface of the brazed assembly, without conducting a conversion coating or undercoating for improving adhesion of a coating layer and water resistance. It is, however, optional to conduct a suitable conversion coating to form a chromate, phosphate, zirconate, or boehmite film.

Figure 3:
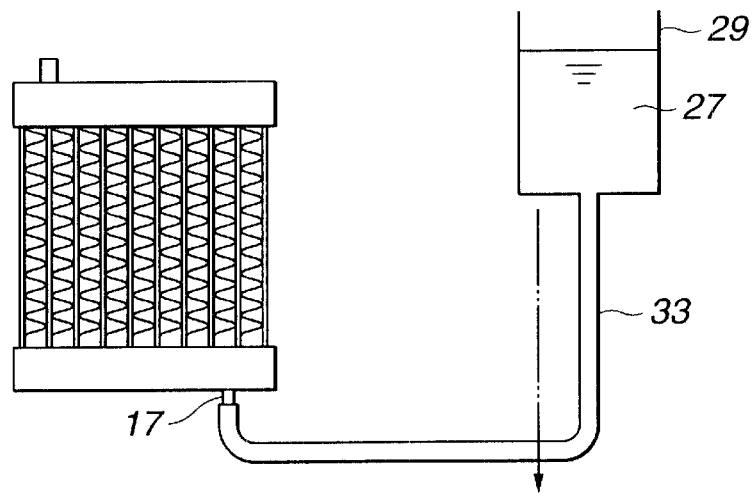
FIG. 3 is a schematic view showing a condition in which a coating liquid is applied in the first process to the inner surface of the brazed assembly of the heat exchanger.

Then, coating layer formation S5 is conducted by coating the inner surface of the brazed assembly with the resin coating layer 25. In fact, the resin coating layer 25 is formed on the inner surface of each of the inlet pipe 15, the inlet tank 11, the tubes 19, the outlet tank 13, and the outlet pipe 17. Coating layer formation S5 is conducted by coating S6, drying S7 and baking S10. Coating S6 is conducted by applying a coating liquid to the inner surface of the brazed assembly. This coating liquid can be prepared by dissolving a resin in a solvent to have a predetermined concentration of the resin. This resin may be selected from phenolic, acrylic and epoxy thermosetting resins. An exemplary commercial product of the resin is NITTOL N-600 (trade name) of Nitto Shinko Co., that is, an epoxy resin containing a bisphenol A type epoxy resin. An exemplary coating liquid may be one containing 25 wt % of a solid matter dissolved in a thinner that is a mixture of cellosolve acetate and n-butanol. In coating S6, the application of a coating liquid can be conducted by filling the inner space of the brazed assembly with a coating liquid and then by discharging the coating liquid from the inner space, thereby forming a precursory layer on the inner surface. With this, it becomes possible to make the resin coating layer 25 uniform in thickness. For example, as shown in FIG. 3, a coating liquid vessel 29, which contains a coating liquid 27 and communicates with the outlet pipe 17 through a pipe 33, can be disposed at a position higher than that of the heat exchanger. With this, it is possible to introduce the coating liquid 27 into the inner space of the brazed assembly at a predetermined pressure and then to fill the inner space with the coating liquid 27. After that, the coating liquid 27 is discharged from the inner space by lowering the position of the coating liquid vessel 29, thereby forming a precursory film on the inner surface of each of the inlet pipe 15, the inlet tank 11, the tubes 19, the outlet tank 13 and the outlet pipe 17.

Figure 4A:
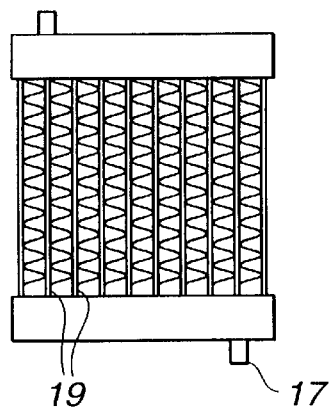
FIG. 4A is an elevational view showing a condition in which the brazed assembly is in a first drying of the first process.
Figure 4B:
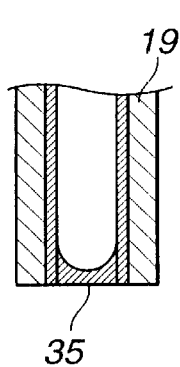
FIG. 4B is an enlarged, partial view showing a tube clogging caused by the accumulation of a coating liquid.
Figure 4C:
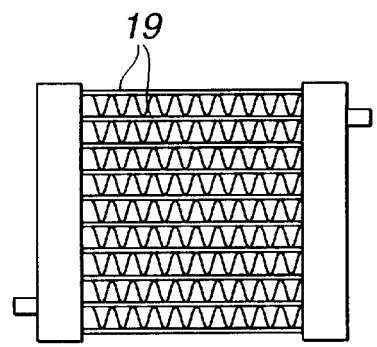
FIG. 4C is an elevational view showing a condition in which the brazed assembly is in a second drying of the first process.

Drying S7 is conducted by vertical drying S8 and then horizontal drying S9. As shown in FIG. 4A, vertical drying S8 can be conducted by allowing the brazed assembly to stand still at normal temperature (e.g., room temperature) for about 10–30 minutes in a condition where the tubes 19 are vertically arranged. With this, an excess of the coating liquid is discharged from the outlet pipe 17. It is optional to vibrate the brazed assembly in a vertical direction in a condition where the tubes 19 are vertically arranged, in order to prevent the occurrence of a tube clogging 35 caused by the accumulation of the coating liquid (see FIG. 4B). Then, as shown in FIG. 4C, horizontal drying S9 is conducted by allowing the brazed assembly to stand still at normal temperature (e.g., room temperature) for about 2 hr in a condition where the tubes 19 are horizontally arranged. By conducting vertical drying S8 and then horizontal drying S9, it is possible to assuredly prevent the occurrence of the tube clogging 35. However, horizontal drying S9 may be omitted, if an excess of the coating liquid is substantially completely removed from the inner space of the tubes 19, for example, by centrifugation.

Baking S10 can be conducted by heating the brazed assembly in a baking furnace, for example, at 130° C. for about 30 minutes as a first step and then 150° C. for about 60 minutes as a second step, thereby turning the dried layer into the resin coating layer. Due to such two-step baking, it becomes possible to prevent foaming of the resin coating layer. The obtained resin coating layer may have a thickness of 5 $\mu$m. The inventors have found that the circulating water was not contaminated with ions of metals and the like, even if the resin coating layer had a thickness as thin as 5 $\mu$m. As the thickness of the resin coating layer becomes thinner, the tubes 19 are improved in thermal conductivity. Thus, it is preferable to make the thickness of the resin coating layer as thin as possible within a range where it adheres to the inner surface of the heat exchanger with a sufficient strength. The obtained heat exchanger was charged with pure water. The conductivity change with time of this pure water was measured, while the pure water was maintained at 80° C. It was found that the conductivity was almost constant during this measurement.

Coating layer formation S5 can be conducted two times. For example, it is optional to prepare an undercoating liquid by dissolving an epoxy resin in a thinner that is a mixture of cellosolve acetate and n-butanol to have a solid matter concentration of 10 wt %, and to prepare a top coating liquid in the same manner except to have a solid matter concentration of 25 wt %. The undercoating liquid was applied to the inner surface of the brazed assembly, thereby forming a precursory layer thereon. This precursory layer was dried at normal temperature and then baked at 130° C. for 1.5 hr to prevent foaming, thereby forming an undercoating layer. After that, the top coating liquid was applied to the undercoating layer, followed by drying at normal temperature. The resulting precursory layer was baked at 130° C. for 1.5 hr and then 150° C. for 4 hr. With this, it was possible to obtain a two-layered resin coating film, which had a thickness of 12 $\mu$m and was improved in strength.

Figure 5:
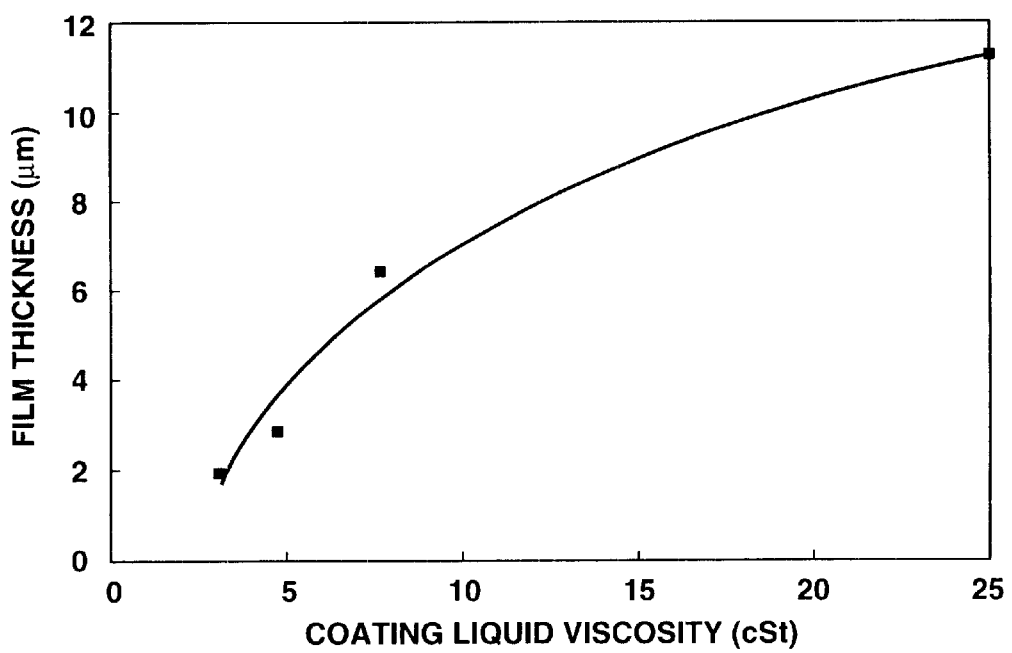
FIG. 5 is a graph showing the film thickness change with the coating liquid viscosity.

FIG. 5 is a graph showing the film thickness change of the resin coating layer with the coating liquid viscosity. In fact, this graph was obtained from an example in which a phenolic thermosetting resin, JA7413R (trade name) of Minnesota Mining & Manufacturing (3M) Co., was dissolved in ethanol to prepare coating liquids having different viscosities. As shown in FIG. 5, it becomes easily possible to form a resin coating layer having a predetermined thickness by adjusting the coating liquid viscosity to a predetermined value. If the coating liquid viscosity is too high, the resin coating layer may become too thick in thickness. With this, the heat exchanger may become too low in thermal conductivity, and a tube clogging may occur. These problems may become conspicuous particularly in case that the inner space of the tube is narrow. If the coating liquid viscosity is too low, the resin coating layer may have defects such pinhole. It is preferable to adjust the coating liquid to have a solid matter concentration of about 15–35 wt % or to have a result of its viscosity measurement with Ford cup of about 10–20 seconds.

In the first process, it is optional to provide a two-piece inlet or outlet tank having a major portion made of aluminum and a base portion. In this case, the base portion may be attached to the tubes.

Figure 6:
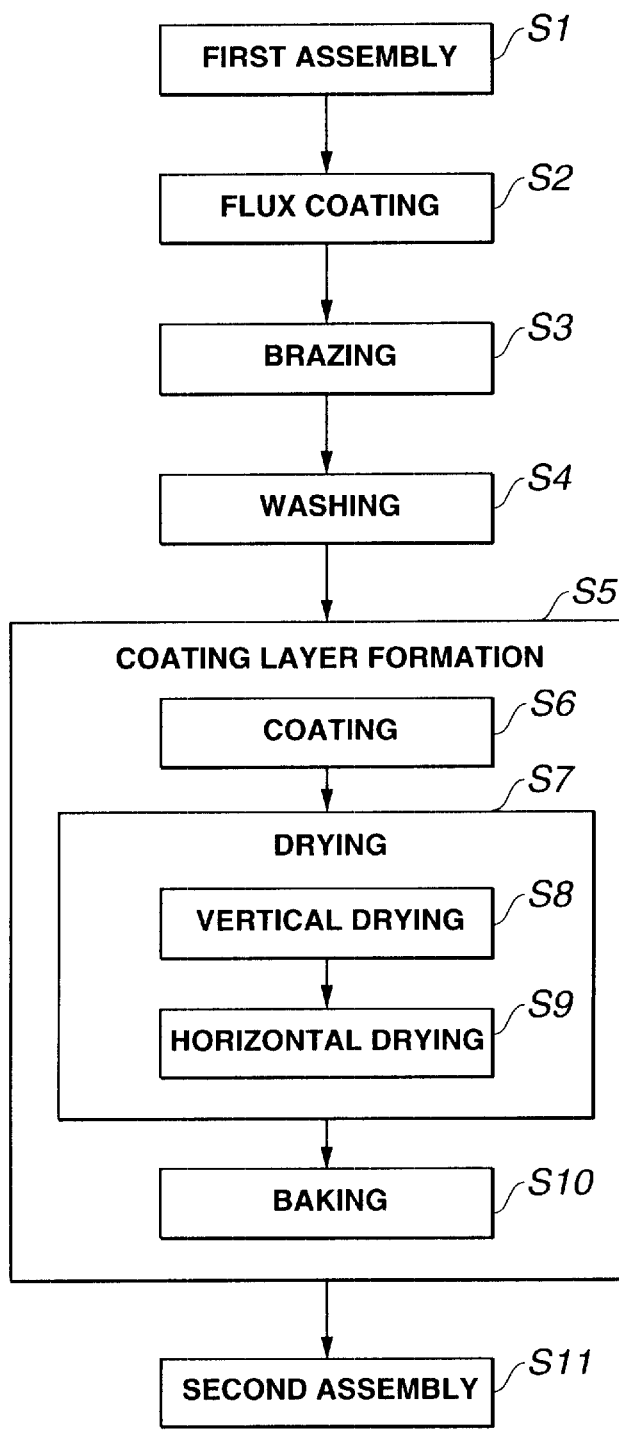
FIG. 6 is a flowchart showing a second process for producing a heat exchanger of the invention.
Figure 7:
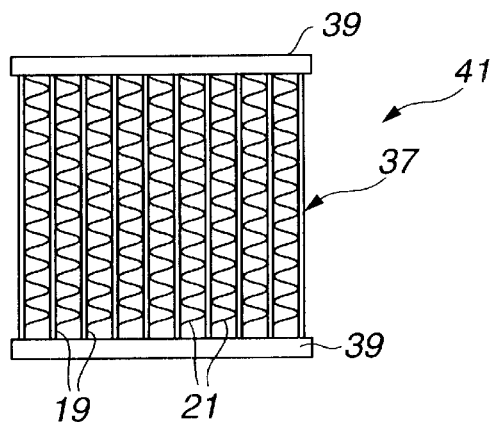
FIG. 7 is an elevational view showing a core portion prepared by the second process.
Figure 8:
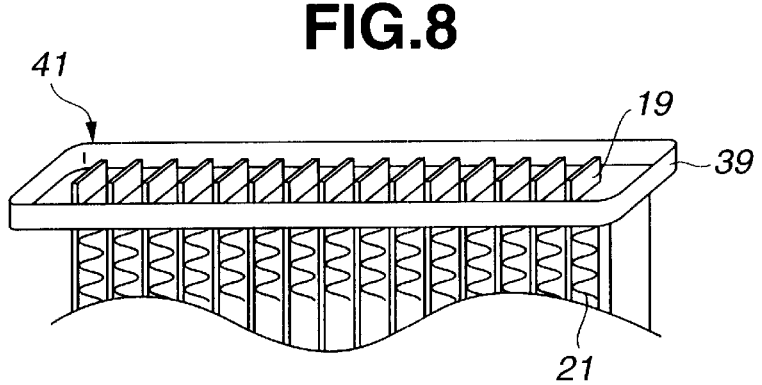
FIG. 8 is a perspective, enlarged view showing a part of the core portion of FIG. 7.
Figure 9:
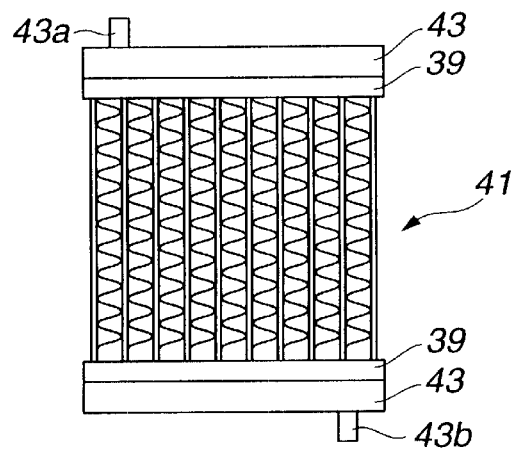
FIG. 9 is an elevational view showing a heat exchanger prepared by the second process.

With reference to FIGS. 6–9, a second process according to the invention will be described in detail in the following. The second process is a slight modification of the first process. For example, the assembly of a heat exchanger is divided into first and second assemblies S1 and S11. In fact, the tubes 19 and the corrugated fins 21 are alternately arranged and assembled together into a laminate portion 37. Then, first assembly S1 of FIG. 6 is conducted by assembling together the laminate portion 37 and base portions 39 of inlet and outlet tanks into a core portion 41 (see FIGS. 7 and 8). These base portions 39 are made of aluminum. Then, flux coating S2, brazing S3, washing S4, and coating layer formation S5 are conducted in the same manners as those of the first process. Then, second assembly S11 is conducted by mounting major portions 43 of the inlet and outlet tanks on the base portions 39 thereof, thereby obtaining a heat exchanger (see FIG. 9). These major portions 43 are made of resin. In fact, the major portions 43 may be fixed to the base portions 39 in a pressing manner with an interposal of rubber packing or the like therebetween. The major portion 43 may be integrally formed with an inlet or outlet pipe 43$a$ or 43$b$.

It is not necessary to conduct flux coating S2 in the first and second processes, for example, if brazing S3 is conducted by vacuum brazing or the like.

The entire disclosure of each of Japanese Patent Application Nos. 11-274608 filed on Sep. 28, 1999 and 2000-238097 filed on Aug. 7, 2000, including specification, drawings, claims and summary, is incorporated herein by reference in its entirety.

What is claimed is:

1. A heat exchanger for cooling a circulating water of a fuel cell, said heat exchanger comprising:
   a plurality of tubes made of aluminum, said tubes having an inner surface that defines an inner space in said tubes such that said circulating water is allowed to flow through said inner space;
   a plurality of fins alternately arranged with said tubes, said fins being assembled together with said tubes into a core portion of said heat exchanger;
   a tank assembled together with said core portion into an assembly; and
   a resin coating layer formed on said inner surface of said tubes such that said resin coating layer is in contact with said circulating water when said circulating water flows through said inner space,
   wherein said resin coating layer is prepared by a method comprising the sequential steps of:
   (a) brazing said assembly into a brazed body;
   (b) filling said inner space of said tubes of said brazed body with a coating liquid; and
   (c) discharging said coating liquid from said inner space.

2. A heat exchanger according to claim 1, wherein said resin coating layer is made of a thermosetting resin and has a thickness of 3–20 $\mu$m.

3. A heat exchanger according to claim 1, wherein said tank comprises (1) a base portion made of aluminum and (2) a major portion made of a resin.

4. A heat exchanger according to claim 3, wherein said base and major portions are fixed to each other with an interposal of a packing therebetween, thereby forming said tank.

5. A heat exchanger according to claim 1, wherein said resin coating layer is made of a thermosetting resin.

6. A heat exchanger according to claim 5, wherein said thermosetting resin is selected from the group consisting of phenolic thermosetting resins, acrylic thermosetting resins, and epoxy thermosetting resins.

7. A heat exchanger according to claim 5, wherein said thermosetting resin comprises a bisphenol A epoxy resin.

8. A heat exchanger according to claim 1, wherein said tubes are made of a clad aluminum.

9. A heat exchanger according to claim 8, wherein said clad aluminum comprises an aluminum substrate and a brazing metal layer formed on said aluminum substrate.

10. A heat exchanger according to claim 9, wherein said aluminum substrate is made of a first aluminum alloy, and said brazing metal layer is made of a second aluminum alloy having a melting point that is lower than that of said first aluminum alloy.

11. A process for producing a heat exchanger for cooling a circulating water of a fuel cell, said process comprising:
providing a core portion of said heat exchanger, said core portion comprising a plurality of tubes made of aluminum and having an inner surface that defines an inner space in said tubes such that said circulating water is allowed to flow through said inner space, and a plurality of corrugated fins, said tubes and said fins being alternately arranged and assembled together into said core portion;
assembling said core portion and a tank made of aluminum into an assembly;
brazing said assembly by heating into a brazed assembly; and
coating an inner surface of said tubes in said brazed assembly with a resin coating layer such that said resin coating layer is in contact with said circulating water when said circulating water flows through said inner space of said tubes.

12. A process according to claim 11, wherein a flux is applied to said assembly prior to said brazing, and then said flux is removed from said brazed assembly after said brazing and prior to said coating.

13. A process according to claim 11, wherein said coating is conducted by a method comprising:
applying a coating liquid comprising a resin to said inner surface of said brazed assembly by filling said inner space of said brazed assembly with said coating liquid and then by discharging said coating liquid from said inner space, thereby forming a precursory layer on said inner surface;
drying said precursory layer into a dried layer; and
baking said dried layer into said resin coating layer.

14. A process according to claim 13, wherein said drying is conducted by a method comprising subjecting said precursory layer to a first drying in a condition where said tubes are vertically arranged.

15. A process according to claim 14, wherein said method further comprises subjecting said precursory layer to a second drying in a condition where said tubes are horizontally arranged, after said first drying.

16. A process according to claim 12, wherein said flux is removed by bringing said flux into contact with a hot pure water.

17. A process according to claim 13, wherein said resin of said coating liquid is a thermosetting resin.

18. A process according to claim 13, wherein said coating liquid has a solid matter concentration of from about 15 to about 35 wt %.

19. A process for producing a heat exchanger for cooling a circulating water of a fuel cell, said process comprising:
providing a laminate portion of said heat exchanger, said laminate portion comprising a plurality of tubes made of aluminum and having an inner surface that defines an inner space in said tubes such that said circulating water is allowed to flow through said inner space, and a plurality of corrugated fins, said tubes and said fins being alternatively arranged and assembled together into said laminate portion;
assembling said laminate portion and a base portion of a tank into a core portion of said heat exchanger, said base portion being made of aluminum;
brazing said core portion by heating into a brazed core portion;
coating an inner surface of said tubes in said brazed core portion with a resin coating layer such that said resin coating layer is in contact with said circulating water when said circulating water flows through said inner space of said tubes; and
mounting a major portion of said tank on said base portion of said tank, thereby forming said tank.

20. A process according to claim 19, wherein a flux is applied to said core portion prior to said brazing, and then said flux is removed from said brazed core portion after said brazing and prior to said coating.

21. A process according to claim 19, wherein said coating is conducted by a method comprising:
applying a coating liquid comprising a resin to said inner surface of said brazed core portion by filling said inner space of said brazed core portion with said coating liquid and then by discharging said coating liquid from said inner space, thereby forming a precursory layer on said inner surface;
drying said precursory layer into a dried layer; and
baking said dried layer into said resin coating layer.

22. A process according to claim 21, wherein said drying is conducted by a method comprising subjecting said precursory layer to a first drying in a condition where said tubes are vertically arranged.

23. A process according to claim 22, wherein said method further comprises subjecting said precursory layer to a second drying in a condition where said tubes are horizontally arranged, after said first drying.

24. A process according to claim 20, wherein said flux is removed by bringing said flux into contact with a hot pure water.

25. A process according to claim 21, wherein said resin of said coating liquid is a thermosetting resin.

26. A process according to claim 21, wherein said coating liquid has a solid matter concentration of from about 15 to about 35 wt %.

27. A process according to claim 19, wherein said major portion of said tank is made of a resin.

* * * * *